(12) United States Patent
Reeves et al.

(10) Patent No.: US 9,895,851 B2
(45) Date of Patent: Feb. 20, 2018

(54) METHOD TO CAST IN PLACE THREADED INSERTS INTO HONEYCOMB COMPOSITE PANELS

(71) Applicant: The Boeing Company, Chicago, IL (US)

(72) Inventors: Brad Jeremy Reeves, Everett, WA (US); James S. Bradley, Arlington, WA (US); Michael Steven Lewis, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 206 days.

(21) Appl. No.: 14/699,804

(22) Filed: Apr. 29, 2015

(65) Prior Publication Data

US 2016/0318264 A1   Nov. 3, 2016

(51) Int. Cl.
*B29C 70/68* (2006.01)
*B32B 3/12* (2006.01)
*B32B 3/06* (2006.01)
*B29C 70/54* (2006.01)
*B29K 105/00* (2006.01)
*B29K 105/20* (2006.01)
*B29L 31/00* (2006.01)
*B32B 5/02* (2006.01)
*B32B 7/08* (2006.01)
*B32B 7/12* (2006.01)

(52) U.S. Cl.
CPC .......... *B29C 70/683* (2013.01); *B29C 70/545* (2013.01); *B32B 3/06* (2013.01); *B32B 3/12* (2013.01); *B29C 2793/0018* (2013.01); *B29K 2105/0097* (2013.01); *B29K 2105/20* (2013.01); *B29L 2031/727* (2013.01); *B32B 5/02* (2013.01); *B32B 7/08* (2013.01); *B32B 7/12* (2013.01); *B32B 2250/40* (2013.01); *B32B 2262/101* (2013.01); *B32B 2419/00* (2013.01); *B32B 2605/18* (2013.01); *B32B 2607/00* (2013.01)

(58) Field of Classification Search
None
See application file for complete search history.

(56) References Cited

U.S. PATENT DOCUMENTS

| | | |
|---|---|---|
| 2,775,916 A | 1/1957 | Baxter et al. |
| 3,016,578 A | 1/1962 | Rohe |
| 3,019,865 A | 2/1962 | Rohe |
| 3,434,261 A | 3/1969 | Rohe |
| 3,451,181 A | 6/1969 | Neuschotz |
| 4,085,652 A | 4/1978 | Vanotti |
| 4,421,811 A * | 12/1983 | Rose ........................ B32B 3/12 156/182 |

(Continued)

OTHER PUBLICATIONS https://en.wikipedia.org/wiki/Threaded_insert Apr. 29, 2015.

*Primary Examiner* — Christina Johnson
*Assistant Examiner* — Mohammad M Ameen
(74) *Attorney, Agent, or Firm* — Joseph M. Rolnicki; Evans & Dixon, L.L.C.

(57) ABSTRACT

A method to cast in place an internally threaded hole in an open cell core of a sandwich structural composite panel enables a threaded fastener to be secured to the sandwich structural composite panel without requiring a separate insert for the fastener.

18 Claims, 9 Drawing Sheets

(56) References Cited

U.S. PATENT DOCUMENTS

| | | | |
|---|---|---|---|
| 4,812,193 A * | 3/1989 | Gauron | B29C 65/42 |
| | | | 156/293 |
| 5,082,405 A | 1/1992 | Witten | |
| 5,223,158 A * | 6/1993 | Lizenby | B29C 39/026 |
| | | | 249/175 |
| 5,240,543 A | 8/1993 | Fetterhoff | |
| 5,558,920 A | 9/1996 | Heide | |
| 7,686,105 B2 * | 3/2010 | Hata | B23B 49/02 |
| | | | 175/394 |
| 8,136,328 B2 | 3/2012 | Erickson et al. | |

* cited by examiner

METHOD TO CAST IN PLACE THREADED INSERTS INTO HONEYCOMB COMPOSITE PANELS

FIELD

This disclosure pertains to a method of producing an internally threaded fastener hole in a sandwich structural composite panel and the fastener hole constructed according to the method.

BACKGROUND

Sandwich structural composite panels are widely used in structures due to their low weight and their high strength. This is particularly true in structures that require high-strength to endure the environment in which the structure is to be used, and low weight for fuel efficiency, for example in aircraft.

The typical construction of a sandwich structural composite panel is comprised of a core panel with a front face sheet and a rear face sheet on opposite sides of the core panel. A layer of adhesive secures the front face sheet to one side of the core panel and a layer of adhesive secures the rear face sheet to the opposite side of the core panel.

The core panel between the front face sheet and the rear face sheet of a sandwich structural composite is often comprised of a plurality of open cells, for example honeycomb open cells. The plurality of open cells adds strength to the sandwich structural composite without significantly increasing weight. However, the presence of the open cells in the interior of the structural composite panel presents a problem when it is desirable to secure a threaded fastener to the structural composite. There is nothing inside the open cells for a threaded fastener to secure to.

Inserts have been developed that are used to secure a threaded fastener in a sandwich structural composite panel. Basically, a hole is formed in the sandwich structural composite panel and the insert is then inserted into the hole. The threaded fastener is then screw threaded into the insert in securing the fastener to the composite panel. However, the use of the fastener inserts adds weight to the composite panel. For every fastener it is desired to secured to the composite panel, a fastener insert is required. The need for the insert substantially doubles the weight of the each threaded fastener secured to the composite panel.

SUMMARY

Disclosed herein is a method to cast in place an internally threaded hole in an open cell core of a sandwich structural composite panel that enables a threaded fastener to be secured to the sandwich structural composite panel without requiring a separate insert for the fastener.

The method is described as being practiced on the basic construction of a sandwich structural composite panel. The panel is comprised of an open cell core and a front face sheet and a rear face sheet secured to the opposite sides of the open cell core.

A hole is first produced through the front face sheet of the composite panel. Any conventional tool, for example a drill bit or a punching tool could be used to produce the hole through the front face sheet.

Next, the hole is extended through the front face sheet and into the open cell core of the composite panel. The hole does not extend completely through the open cell core of the panel and stops short of the rear face sheet of the panel.

The cross-sectional area of the hole in the interior of the open cell core is then enlarged. This creates a void in the interior of the open cell core. The void has a cross-section area that is larger than the cross-section area of the hole through the first face surface of the panel.

The tool is then removed from the hole. A hardening substance, for example a curable adhesive is then applied to the void in the open cell core.

A thread mold is then inserted through the hole in the front face sheet and into the adhesive in the void. The threaded mold is basically a threaded fastener.

The adhesive is then allowed to cure, thereby forming the internally threaded hole in the front face surface and the open cell core of the composite panel. Following curing and hardening of the adhesive, the thread mold is removed from the internally threaded hole formed.

In the above manner, the method of this disclosure produces an internally threaded hole through the front face sheet of a sandwich structural composite panel and into the open cell interior core of the panel without requiring separate inserts.

The features, functions, and advantages that have been discussed can be achieved independently in various embodiments or may be combined in yet other embodiments, further details of which can be seen with reference to the following description and drawings.

BRIEF DESCRIPTION OF THE DRAWING FIGURES

Further features of the method of producing an internally threaded hole in a sandwich structure composite panel and the internally threaded hole formed are set forth in the following detailed description of the method and in the drawing figures.

DETAILED DESCRIPTION

Figure 1:
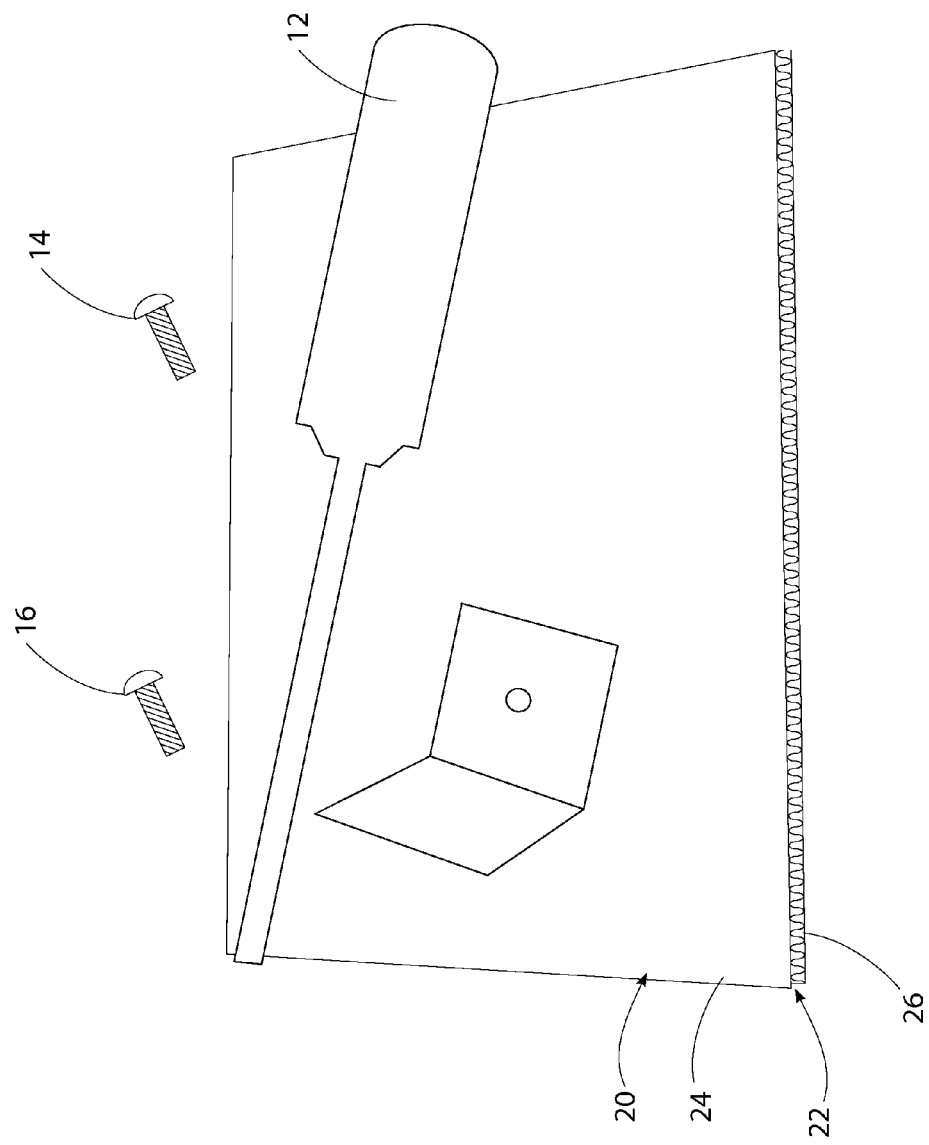
FIG. 1 is a representation of a perspective view of the components used in practicing the method of this disclosure.

Referring to FIG. 1, the method of producing an internally threaded hole in a sandwich structural composite panel of this disclosure basically makes use of a tool 10 for drilling or punching a hole of a desired diameter and cross-sectional area, an adhesive applicator 12 for applying adhesive to the produced hole, a thread mold 16 to form internal screw threads in the hole and a threaded fastener 18.

Figure 2:
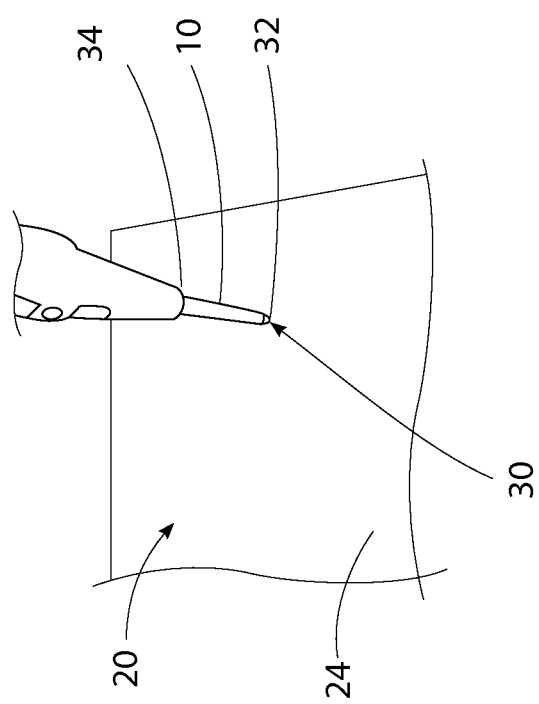
FIG. 2 is a representation of a perspective view of a method step of producing a hole through a front face sheet surface of a sandwich structural composite panel and extending the hole into the open cell core of the panel.
Figure 3A:
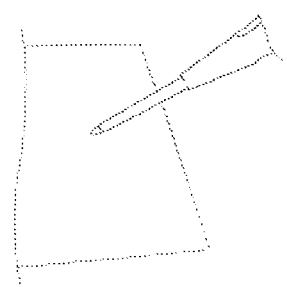
FIGS. 3A-3E are representations of perspective views of further steps of enlarging a cross-sectional area of the hole inside the open cell core of the composite panel.
Figure 3B:
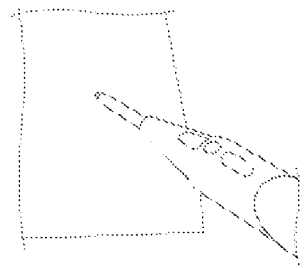
Figure 3C:
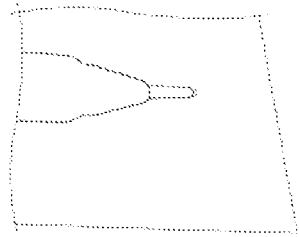
Figure 3D:
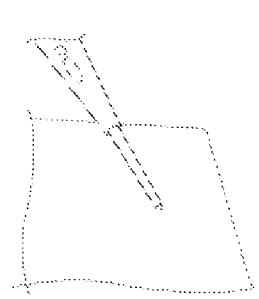
Figure 3E:
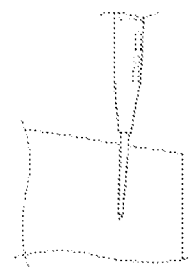

Referring to FIG. 2, the method of this disclosure is represented as being practiced on a sandwich structural composite panel 20 having a basic construction. The panel 20 is comprised of an open cell core 22 and a front face sheet 24 and a rear face sheet 26 secured to opposite sides of the open cell core 22. In the example represented in the drawing figures, the open cell core 22 is a honeycomb core. Other configurations of cores employed in the construction of sandwich structural composite panels may be used. The front face sheet 24 is a fiberglass skin or sheet and the rear face sheet 26 is a fiberglass skin or sheet. The front face sheet 24 is secured by an adhesive to one side of the open cell core 22 and the rear face sheet 26 is secured by an adhesive to the opposite side of the open cell core 22. Other equivalent materials could be employed for the front face sheet 24 and the rear face sheet 26. Additionally, there could be further sheets of other types of materials in addition to the front face sheet 24 and the rear face sheet 26 adhered to the opposite sides of the open cell core 22.

Figure 4:
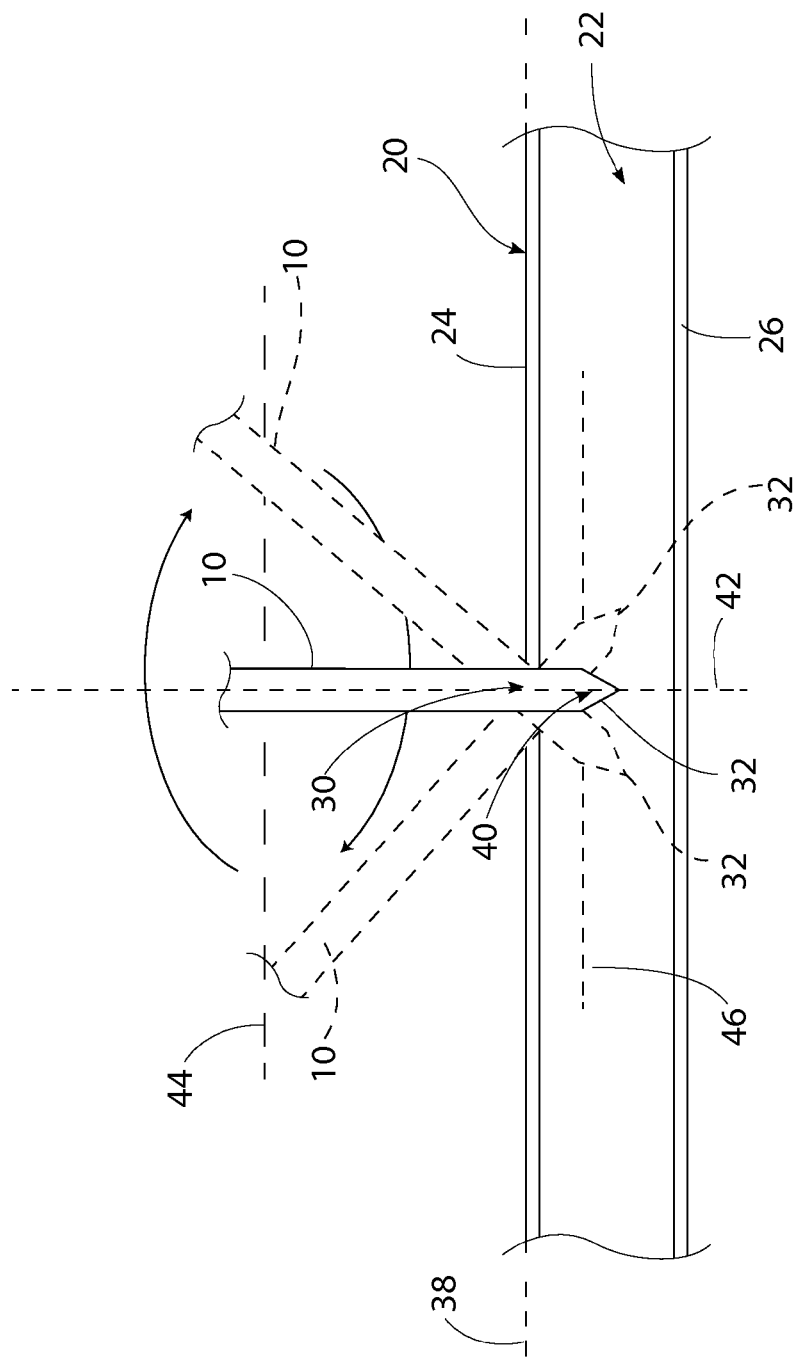
FIG. 4 is a representation of a cross-section view of the method steps of enlarging the cross-sectional area of the hole in the interior of the open cell core of the composite panel.

Referring to FIG. 2, a hole 30 is first produced through the front face sheet 24 using the tool 10. As represented in FIG. 2, the tool 10 has an elongate shaft with opposite distal 32 and proximal 34 ends. For example, the tool 10 could be a drill bit connected to a hand held motive source 36 at the tool proximal end 34 for rotation of the drill bit. Alternatively, the tool 10 could be a punching tool for punching holes, or other similar equivalent type of tool. The tool 10 is positioned with the elongate shaft of the tool substantially perpendicular to a first plane 38 of the front face sheet 24 of the sandwich structural composite panel 20. The hole 30 is drilled into the front face sheet 24 by the tool distal end 32 drilling through the front face sheet 24. The hole is then extended through the hole 30 in the front face sheet and into the open cell core 22 forming an extension of the hole 40 in the open cell core. Referring to FIG. 4, it can be seen that the extension of the hole 40 that extends into the open cell core 22 has a center axis 42 that is coaxial with the hole 30 through the front face sheet 24 and is substantially perpendicular to the first plane 38 defined by the front face sheet 24 of the sandwich structural composite panel 20. Also as represented in FIG. 4, the extension of the hole 40 stops short of the rear face sheet 26 and does not extend completely through the open cell core 22. Thus, the extension of the hole 40 in the open cell core 22 is spaced from the rear face sheet 26 of the sandwich structural composite panel 20.

The cross-sectional area of the extension of the hole 40 inside the open cell core 22 is then enlarged. Enlarging the extension of the hole 40 is accomplished by using the tool 10 that was used to form the hole 30 in the front face sheet 24 and extend the hole 40 into the open cell core 22. While the tool 10 is being rotated by the hand held motive source 36, the tool is moved from its substantially perpendicular orientation to the front face sheet 24 to an orientation of the length of the tool 10 at an angle of less than 90 degrees relative to the front face sheet 24. This orientation of the tool 10 is represented in FIG. 4.

Figure 5:
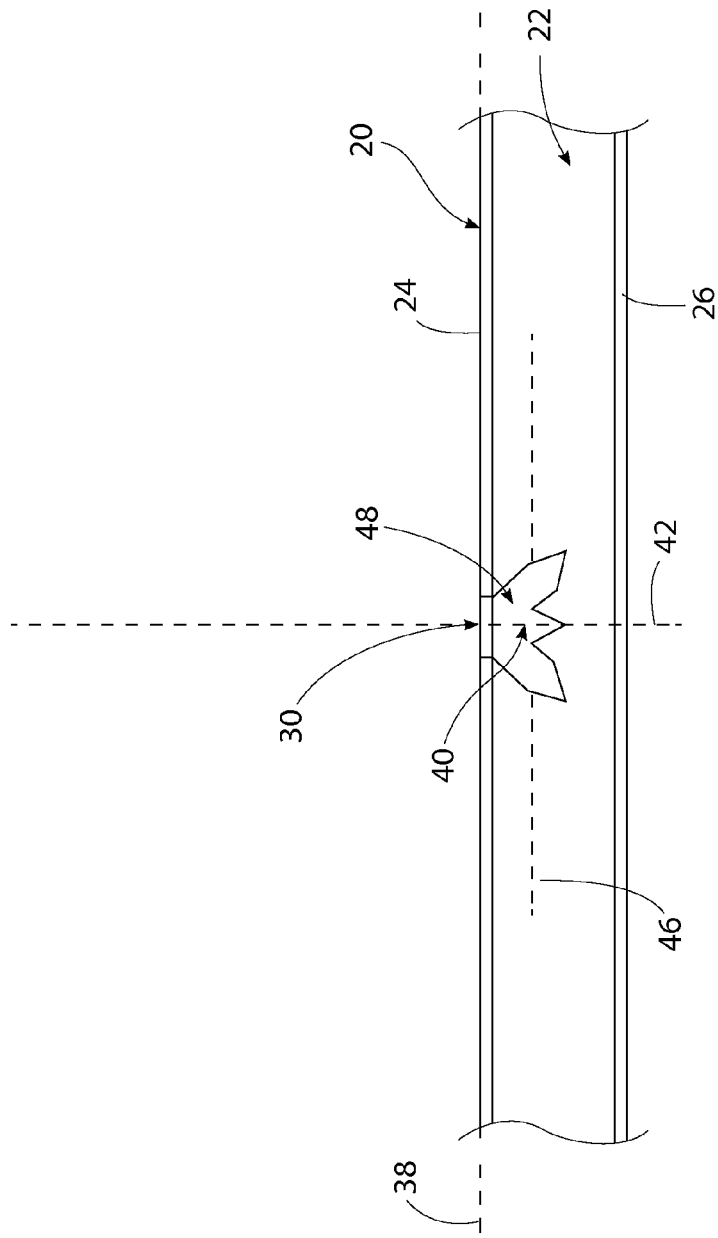
FIG. 5 is a representation of a cross-section view of the hole formed through the front face sheet surface and a void formed in the open cell core of the composite panel.
Figure 6:
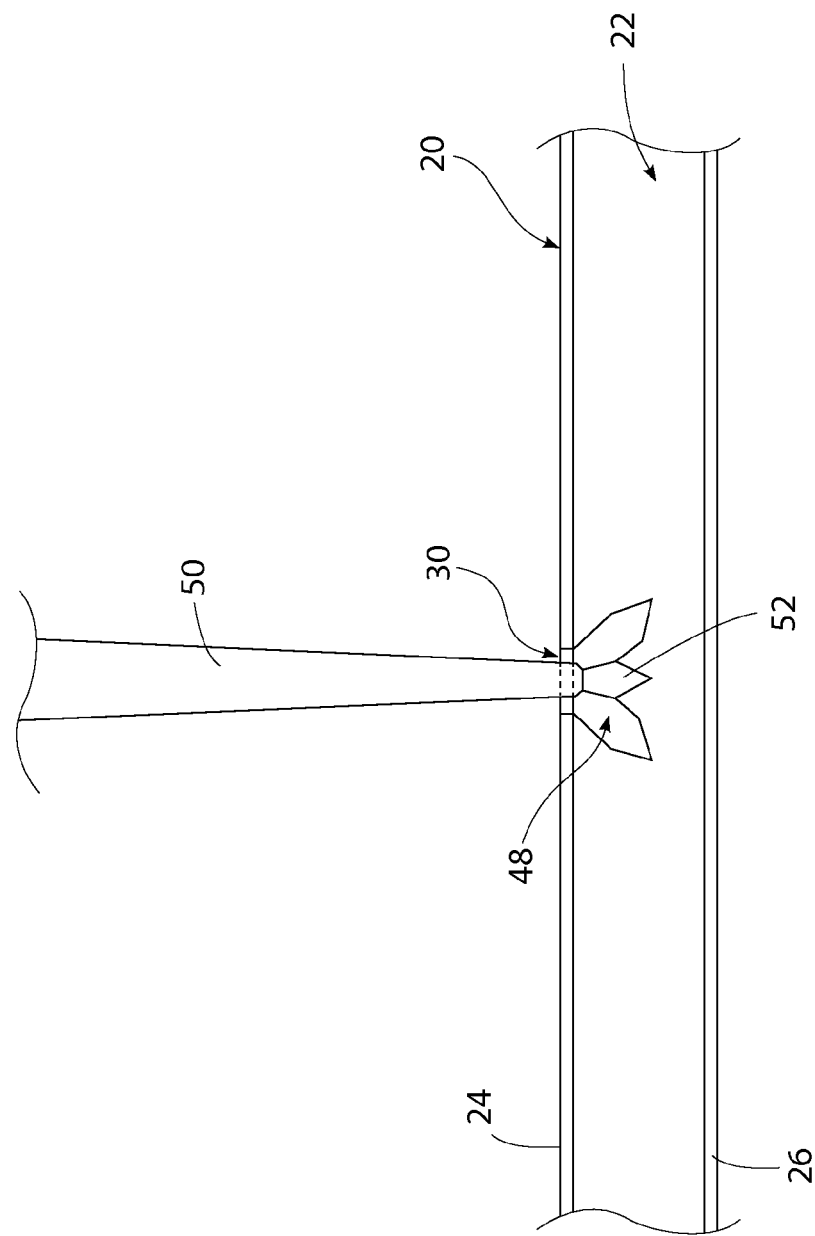
FIG. 6 is a representation of a cross-section view of applying a curable substance through the hole in the front face sheet surface and into the void in the open cell core of the composite panel.
Figure 7:
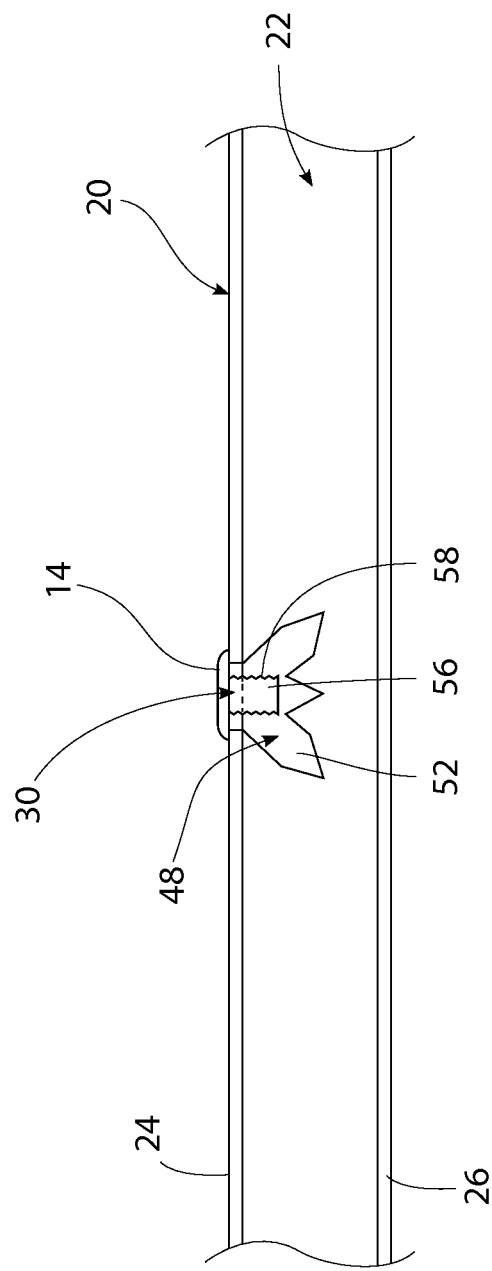
FIG. 7 is a representation of a cross-section view of inserting a thread mold into the curable substance applied to the hole through the front face sheet surface and in the void in the interior of the open cell core of the composite panel.
Figure 8:
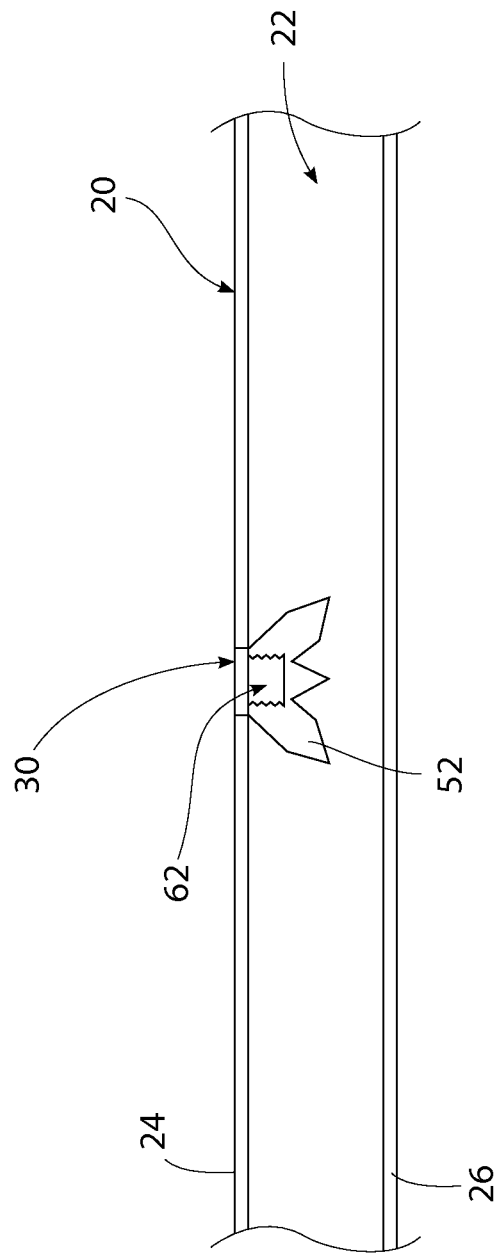
FIG. 8 is a representation of a cross-section view of the internally threaded hole formed in the hardened curable substance applied into the hole in the front face sheet surface and the void in the interior of the open cell core of the composite panel.
Figure 9:
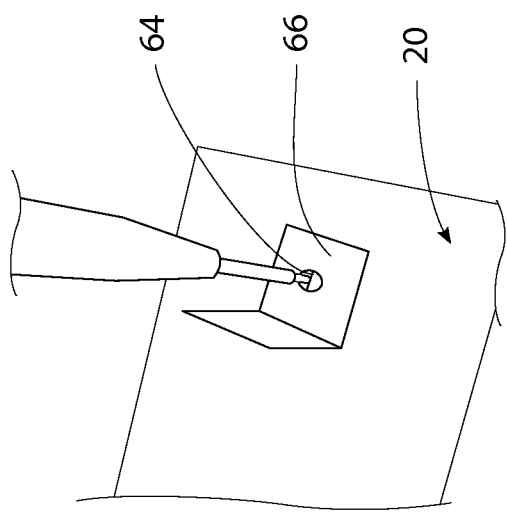
FIG. 9 is a representation of a perspective view of attaching a bracket to the front face sheet surface of the composite panel using a threaded fastener.

With the tool positioned at an angle of less than 90 degrees relative to the front face sheet 24, the length of the tool 10 is then manually rotated around the hole 30 through the front face sheet 24. The tool proximal end 34 is manually rotated in a circle in a second plane 44 positioned substantially parallel with the front face sheet 24 and the first plane 38. This results in the tool distal end 32 being moved in a circle in a third plane 46 substantially parallel with the front face sheet 24, the first plane 38 and the second plane 44. This rotational movement of the tool 10 is represented in FIGS. 3A-3E, and in FIG. 4. This movement of the tool 10 causes the tool distal end 32 to create a void 48 inside the interior of the open cell core 22. The void 48 has a cross-sectional area in the third plane 46 that is larger than the cross-sectional area of the hole 30 through the front face sheet 24. Furthermore, the void 48 has a general conical configuration with an apex of the conical configuration being positioned adjacent the hole 30 through the front face sheet 24. This configuration of the void 48 is represented in FIG. 5.

The tool 10 is then removed from the void 48 and the hole 30 through the front face sheet 24. A tubular tip 50 of the adhesive applicator 12 is then positioned in the hole 30 through the front face sheet 24. The adhesive in the adhesive applicator 12 is then dispensed through the tubular tip 50 and is applied to the void 48 in the interior of the open cell core 22. Instead of an adhesive, some other hardening substance that hardens or cures over time could be used. For example, a plastic that has been heated to a sufficient extent where the plastic would flow through the hole 30 in the front face sheet 24 and into the void 48 filling the void.

The thread mold 14 is then inserted into the adhesive filling the void 48 in the open cell core 22. According to the disclosed method, the thread mold 14 is basically a nylon non-stick bolt having a shaft 56 and an exterior screw thread 58 on the shaft 56 that are dimensioned to duplicate basically the threaded shaft of the fastener to be inserted into the internally threaded hole formed by the curing of the adhesive 52. With the thread mold shaft 56 inserted into the adhesive 52 filling the void 48, the adhesive is allowed to cure. Curing of the adhesive 52 forms the internally threaded hole 62 in the void 48. Following curing and hardening of the adhesive 52, the thread mold 14 is then removed from the internally threaded hole 62 formed in the open cell core 22 of the sandwich structural composite panel 20.

A complementary externally threaded fastener 64 can then be screw threaded into the internally threaded hole 62 for securing an object, for example a bracket 66 to the front face sheet 24 of the sandwich structural composite panel 20.

In the disclosed manner, the method of this disclosure produces an internally threaded hole 62 through the front face sheet 24 of the sandwich structural composite panel 20 and into the open cell core 22 of the panel without requiring separate inserts.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A method of producing an internally threaded hole in a panel, the method comprising:

producing a hole through a surface of the panel with a tool having a straight length and opposite proximal and distal ends by inserting the distal end of the tool through the surface of the panel and into an interior of the panel with the straight length of the tool positioned substantially perpendicular to the surface of the panel;
then orienting the straight length of the tool at an angle other than perpendicular relative to the surface of the panel; and,
then rotating the proximal end of the tool in a circle around the hole in the surface of the panel;
applying a hardening substance into the hole;
inserting a thread mold in the hardening substance applied in the hole;
allowing the hardening substance to harden to a solid;
removing the thread mold from the solid leaving an internally threaded hole in the solid.

2. The method of claim 1, further comprising:
the hardening substance being an adhesive.

3. The method of claim 1, further comprising:
enlarging a cross-section area of the hole in the interior of the panel where the cross-section area of the hole in the interior of the panel is larger than a cross-section area of the hole through the surface of the panel.

4. The method of claim 1, further comprising:
producing the hole through a front surface of the panel; and,
stopping the hole in the interior of the panel where the hole is spaced from a rear surface of the panel that is on an opposite side of the interior of the panel from the front surface of the panel.

5. The method of claim 1, further comprising:
producing the hole through the surface of the panel and into the interior of the panel with the hole in the interior of the panel having a conical configuration with an apex of the conical configuration being adjacent the hole in the surface of the panel.

6. The method of claim 1, further comprising:
producing the hole through the surface of the panel and into the interior of the panel by using the tool to drill the hole through the surface of a panel and into the interior of the panel.

7. The method of claim 1, further comprising:
producing the hole through the surface of the panel and into the interior of the panel by using the tool to punch the hole through the surface of the panel and into the interior of the panel.

8. A method of producing an internally threaded hole in panel having open cell core and a face sheet and rear sheet on opposite sides of the open cell core, the method comprising:
producing a hole through the face sheet of the panel and into the open cell core of the panel with a tool having a straight length and opposite proximal and distal ends by inserting the distal end of the tool through the face sheet of the panel and into the open cell core of the panel with the straight length of the tool positioned substantially perpendicular to the face sheet of the panel;
stopping the hole in the open cell core spaced from the rear sheet of the panel;
then orienting the straight length of the tool in the hole through the face sheet of the panel at an angle of less than 90° relative to the face sheet of the panel; and,
then rotating the proximal end of the tool in a circle in a plane positioned substantially parallel with the face sheet of the panel around the hole through the face sheet of the panel;
enlarging a cross-section area of the hole in the open cell core of the panel to where the cross-section area of the hole in the open cell core of the panel is larger than a cross-section area of the hole through the face sheet of the panel;
injecting a liquid adhesive through the hole through the face sheet of the panel and into the hole in the open cell core of the panel;
inserting a threaded mold having a shaft with a cylindrical exterior surface and a screw thread extending around the cylindrical exterior surface into the liquid adhesive in the hole in the open cell core of the panel;
allowing the liquid adhesive to dry to a solid in the hole in the open cell core of the panel; and,
removing the thread mold from the solid leaving an internally threaded hole in the solid.

9. The method of claim 8, further comprising:
the interior of the panel being an open cell core of the panel.

10. The method of claim 8, further comprising:
producing the hole through the face sheet of the panel and into the open cell core of the panel with the hole in the open cell core of the panel having a conical configuration with an apex of the conical configuration being adjacent the hole in the face sheet of the panel.

11. The method of claim 8, further comprising:
producing the hole through the face sheet of the panel and into the open cell core of the panel by drilling the hole through the face sheet of the panel and into the open cell core of the panel.

12. The method of claim 8, further comprising:
producing the hole through the face sheet of the panel and into the open cell core of the panel by using the tool to punch the hole through the face sheet of the panel and into the open cell core of the panel.

13. The method of claim 8, further comprising:
the open cell core of the panel being a honeycomb open cell core.

14. A method of producing an internally threaded hole in a panel having an open cell core and a face sheet and rear sheet on opposite sides of the open cell core, the method comprising:
producing a hold through the face sheet of the panel and into the open cell core of the panel with a tool having a straight length and opposite proximal and distal ends by inserting the distal end of the tool in the face sheet of the panel and into the open cell core of the panel with the straight length of the tool positioned substantially perpendicular to the face sheet of the panel;
stopping the hole in the open cell core spaced from the rear sheet of the panel;
then orienting the straight length of the tool in the hole through the face sheet of the panel at an angle of less than 90° relative to the face sheet of the panel;
then rotating the proximal end of the tool in a circle in a plane positioned substantially parallel with the face sheet of the panel around the hole through the face sheet of the panel;
injecting a liquid adhesive through the hole through the face sheet of the panel and into the hole in the open cell core of the panel;
inserting a threaded mold having a shaft with a cylindrical exterior surface and a screw thread extending around the cylindrical exterior surface into the liquid adhesive in the hole in the open cell core of the panel;
allowing the liquid adhesive to dry to a solid in the hole in the open cell core of the panel; and,
removing the threaded mold from the solid leaving an internally threaded hole in the solid.

15. The method of claim 14, further comprising:
producing the hole through the face sheet of the panel and into the open cell core of the panel with the hole in the open cell core of the panel having a conical configuration with an apex of the conical configuration being adjacent the hole in the face sheet of the panel.

16. The method of claim 14, further comprising:
producing the hole through the face sheet of the panel and into the open cell core of the panel by drilling the hole through the face sheet of the panel and into the open cell core of the panel.

17. The method of claim 14, further comprising:
producing the hole through the face sheet of the panel and into the open cell core of the panel by using the tool to punch the hole through the face sheet of the panel and into the open cell core of the panel.

18. The method of claim 14, further comprising:
the open cell core of the panel being a honeycomb open cell core.

\* \* \* \* \*